United States Patent Office 3,840,491
Patented Oct. 8, 1974

3,840,491
PETROLEUM RESIN PAINT COMPOSITIONS
Hiroshi Yaginuma, Yokohama, Takashi Suzuki, Yamato, and Yoshifumi Watanabe, Kamakura, Japan, assignors to Nippon Zeon Co., Ltd., Tokyo, Japan
No Drawing. Filed Dec. 27, 1971, Ser. No. 212,735
Claims priority, application Japan, Dec. 31, 1970, 46/123,522
Int. Cl. C08f 29/12; C07c 11/12; C03c 17/32
U.S. Cl. 260—33.6 UA                    3 Claims

ABSTRACT OF THE DISCLOSURE

An improved petroleum resin paint composition includes a film-forming element and a solvent; the main component of the film-forming element being a mixture of 20–40% by weight of a liquid polybutadiene having at least 70% of the unsaturated double bonds thereof of cis-1,4 structure and a numerical average molecular weight in the range of 1,000–5,000, and 80–60% by weight of a petroleum resin having a softening point in the range of 80–130° C.

---

This invention relates to improved petroleum resin compositions, and more particularly to greatly improved petroleum resin paint compositions which comprises as the main component of their film-forming elements a mixture consisting of 20–40% by weight of a liquid polybutadiene of the character that at least 70% of the unsaturated double bonds thereof is of cis-1,4 structure and the numerical average molecular weight thereof is 1,000–5,000, and 80–60% by weight of a petroleum resin having a softening point of 80–130° C.

A composition comprising as a film-forming element a mixture of petroleum resin and Chinese tung oil or linseed oil has been known as a petroleum resin paint. However, this prior art paint composition is said to be not in the least useful for practical application because of the unsatisfactory physical properties of the resulting paint film as manifested by a flexibility test, an impact resistance test, an Erichsen test, a cross cut test, etc. It is far inferior to the medium oil alkyd resin paints widely used heretofore, not only in physical properties but also chemical properties such as water resistance and resistances to chemicals. Furthermore, the natural oil which is one component of this prior art paint composition cannot be said to be an industrially advantageous material because of its non-uniformity in quality and instability in price.

The present invention has for its object the provision of an improved petroleum resin paint composition, particularly a petroleum resin paint composition which is excellent in the properties which are manifested by a flexibility test, an impact resistance test, an Erichsen test, a cross cut test, an adhesion test, a water resistance test and a chemical resistance test.

The above object of the present invention can be attained by using liquid cis-1,4-polybutadiene and petroleum resin obtained by polymerization of industrially easily procurable petroleum chemical materials in admixture at a specific ratio. Namely, according to the present invention there are provided paint compositions comprising a mixture of 20–40% by weight of a liquid polybutadiene of the character that at least 70% of the unsaturated double bonds thereof is of cis-1,4 structure and the numerical average molecular weight thereof is 1,000–5,000, and 80–60% by weight of a petroleum resin having a softening point of 80–130° C.

The liquid polybutadiene used in the present invention is one containing at least 70% of cis-1,4 structure, which is generally produced by polymerizing butadiene using a Ziegler catalyst consisting essentially of an organoaluminum halide and a nickel compound, but is not restricted by the production process.

Liquid polybutadiene produced by emulsion polymerization, anionic polymerization utilizing an alkali metal initiator such as a sodium catalyst or butyllithium catalyst or cationic polymerization utilizing a Friedel-Crafts catalyst, contains less than 70% of cis-1,4 structure and hence the use of such liquid polybutadiene as a component of the petroleum resin paint will not bring about improvements in the physical properties of the paint film as stated above.

On the other hand, when a liquid polybutadiene which contains 70% or more cis-1,4 structure but has a numerical average molecular weight of less than 1,000 is mixed with petroleum resin, the resultant petroleum resin paint forms a film which tends to be subjected to surface shrinkage which is practically impossible to prevent. When the numerical average molecular weight of the liquid polybutadiene is in excess of 5,000, the paint comprising a mixture of such liquid polybutadiene and petroleum resin does not dry at a practically acceptable apparent speed under the normal conditions of application since the evaporation speed of a solvent for the petroleum resin is too slow. Furthermore, the liquid polybutadiene having a numeral average molecular weight in excess of 5,000 is readily gelled during cooking which is frequently performed in the process of production of paints, and therefore, calls for a special care in the production of the paint.

The petroleum resin which is the other component of the paint compositions according to the invention is one having a softening point of 80–130° C. Such a petroleum resin can be obtained by polymerizing a high boiling point olefin fraction of 5 or more carbons which is usually obtained after taking useful materials, such as ethylene, propylene, butadiene, isoprene, etc., out of petroleum fraction by naphtha cracking. However, the petroleum resin to be used in the present invention is not limited to a particular method of preparation. For example, a resinous polymer obtained by copolymerizing 1,3-pentadiene with an olefin such as 2-methylbutene-2 is also included within the definition of the petroleum resin used in the invention. A preferable petroleum resin to be used according to the present invention has the following properties:

Softening point _____ 80–130° C.
Acid value _____ 1 or less.
Iodine value _____ 30–300.
Average molecular weight _____ 350–1,500.
Color value (Gardner) _____ 13 or less.

Various other types of petroleum resins are known which have lower softening points. However, the paints comprising these petroleum resins have the defect that they are insufficiently satisfactory in the physical properties mentioned above, and the additional defect that they are quite unsatisfactory in those properties at elevated temperatures, such as resistance to boiling water. The latter defects causes the baking temperature to be undesirably lowered when the paints are used as baking paints.

In the present invention, the mixing ratio of the liquid polybutadiene and the petroleum resin is an important factor, and by mixing them within a specific range or mixing ratio, a remarkable synergistic effect is obtained to produce a paint having an excellent performance which can never be obtained from the liquid cis-1,4-polybutadiene or petroleum resin alone. The performance of the paint is equivalent to that of epoxy resin paints which are known as having an excellent performance but not widely used because of their high costs.

Namely, according to the present invention a paint composition excelling in the properties manifested by a flexibility test, an impact resistance test, an Erichsen test, a cross cut test, an adhesion test, a water resistance test and a chemical resistance test can be obtained only when 20-40% by weight of the liquid polybutadiene of the character described and 80-60% by weight of the petroleum resin of the character described are used in admixture.

When the amount of the liquid polybutadiene is in excess of 40% by weight, the drying speed of the paint film formed sharply decreases and the paint film cannot be dried only by the use of a known metallic drier such as a naphthenate or octenoate of lead, cobalt, manganese, calcium or zinc and a special consideration needs to be given to the drying of the paint in both cases when it is prepared for room temperature drying and when it is prepared for baking drying. Additionally, the paint film dried over a lengthy period of time is, for some unknown reasons, inferior in the physical properties manifested by a flexibility test, an impact resistance test, an Erichsen test, a cross cut test, an adhesive test, etc.

When the amount of the liquid polybutadiene is less than 20% by weight, the resultant paint is also extremely unsatisfactory in both the above-mentioned physical properties and the chemical properties manifested by a water resistance test, a chemical resistance test, etc.

The liquid polybutadiene and the petroleum resin used in the compositions of the present invention have a sufficient compatibility with each other and the liquid polybutadiene has a viscosity low enough to facilitate the painting operation. Therefore, it will be understood that the paint compositions of the present invention can be prepared simply by dissolving the petroleum resin in the pulverized state in the liquid polybutadiene. Of course, a diluent may optionally be used in the preparation of the subject paint compositions as is generally practiced in the preparation of varnishes. It will also be obvious that the paint compositions of the invention may contain pigments, fillers, etc. as required.

The effects and features of the invention will become more apparent from the following description on examples which are merely illustrative of the compositions of the present invention and are not intended to be a limitation of the scope thereof.

EXAMPLE 1

A 6 l. polymerization vessel equipped with a stirrer was cooled to 0° C. and reduced in internal pressure, and 1.2 kg. of butadiene and 1.8 kg. of butene-1 were charged into the vessel under pressure. 2.6 cc. of a 293 g./l. diethylaluminum chloride solution in benzene and 16.1 cc. of a 142 g./l. ethylaluminum dichloride solution in benzene were respectively added by means of a syringe, and then the internal temperature of the polymerization vessel was elevated to 30° C. When the internal temperature had reached 30° C., a 36.5 g./l. nickel naphthenate solution in benzene was continuously added by means of a micropump, in such a manner that the first 5.1 cc. of the solution was added over a period of 1 hour. Upon completion of the addition of nickel naphthenate solution, the reaction was continued for 1 hour. A small quantity of methanol was added at the point 2 hours after the addition of nickel naphthenate had been started, and the polymerization was stopped. The conversion of the butadiene to polymer was 61.5%. The pressure of the reaction system was reduced and the unreacted butadiene and butene-1 were recovered. After removing the remaining catalyst by washing it with methanol, the reaction product was dried by a thin film type vacuum drier. The liquid polybutadiene thus obtained showed the following properties:

| | |
|---|---|
| Numerical average molecular weight | 1,600 |
| Molecular structure (percent): | |
| Cis-1,4 | 79.0 |
| Vinyl | 1.1 |
| Trans-1,4 | 19.9 |
| Reduction in amount by heating under reduced pressure | 0.11 |
| Viscosity at 20° C. (centipoise) | 176 |

On the other hand, a 50% solution in toluene of a petroleum resin (a product of Mitsui Petrochemical Industries, Ltd., Japan, being sold under trade name of Petrosin 120) having the following properties was prepared:

| | |
|---|---|
| Softening point °C | 120 |
| Color value (Gardner) | 12 |
| Saponification value | 1 |
| Bromine value mg./100 g | 20-40 |

The liquid polybutadiene and the petroleum resin solution in toluene, mentioned above, were mixed at the varying mixing ratios indicated in Table 1 and the resultant mixtures were individually applied onto a clean glass plate, a clean tin plate and a clean cold rolled soft steel plate respectively. 1 week after the films had been semi-cured, the films were subjected to tests. All the tests were conducted according to JIS K 5400, with the results shown in Table 1.

TABLE 1

| Run number | 1 | 2 | 3 | 4 | 5 | 6 |
|---|---|---|---|---|---|---|
| Liquid polybutadiene | 0 | 10 | 20 | 30 | 40 | 50 |
| Petroleum resin | 100 | 90 | 80 | 70 | 60 | 50 |
| Toluene | 100 | 90 | 80 | 70 | 60 | 50 |
| Set to touch time (min.) | 5 | 7 | 10 | 16 | 150 | 10,080 |
| Semi-curing tome (min.) | 30 | 55 | 75 | 90 | 510 | 14,400 |
| Flexibility test (cylindrical mandrel apparatus): | | | | | | |
| 10 mm. in diameter | x | x | 0 | 0 | 0 | x |
| 8 mm. in diameter | x | x | 0 | 0 | 0 | x |
| 2 mm. in diameter | x | x | 0 | 0 | 0 | x |
| Impact resistance test (Du Pont) 500 g. x 50 cm | x | x | 0 | 0 | 0 | x |
| Erichsen value (mm.) | 0.4 | 0.7 | 4.2 | >11 | >11 | 2.2 |
| Cross cut value (point) | 0 | 0 | 4 | 10 | 10 | 6 |
| Accelerated water-resistance | Poor | Poor | Good | Good | Good | Poor |
| Water-resistance | Whitened | Whitened | Slightly whitened | Slightly whitened | Slightly whitened | Whitened |
| Alkali resistance | x | x | 0 | 0 | 0 | x |
| Solvent resistance | x | x | 0 | 0 | 0 | 0 |

The set to touch time and semi-curing time were measured at a temperature of 20° C. and a humidity of 73%. It will be clearly understood that the drying speed sharply decreases when the amount of the liquid polybutadiene exceeds 40% by weight. It will also be understood that the samples in Runs. No. 1-5 each has a practically acceptable drying speed.

The flexibility test was conducted by bending the film of each sample over the half circumference of a rod having the diameter indicated, and the result thereof is indicated by the symbol "o" which means that the paint film was not cracked or separated and therefore, is durable with bending, or the symbol "x" which means that the paint film was cracked or separated and therefore, is not durable with bending. It will be seen that the samples in Runs Nos. 3-5 only have an excellent bending strength and are durable with bending even over the half circumference of the rod having a diameter of 2 mm.

The impact resistance test was conducted by using a Du Pont impact tester with a punch of 6.35 mm. in diameter, described in JIS K 5400, and the result thereof is indicated by the symbol "o" which means that the paint film was not cracked or separated when the substrate plate was deformed by the impact strength applied thereto by the punch, or the symbol "x" which means that the paint film was cracked or separated from the substrate plate under the same condition. It will be understood that the samples in Runs Nos. 3–5 only have an excellent impact resistance.

With regard to the Erichsen test, it is generally said that a satisfactory Erichsen value from the practical point of view is 4 mm. or larger, and from this basis, it will be seen that the samples in Runs Nos. 3–5 only are satisfactory in respect of Erichsen value. It is particularly worth to note that the Erichsen values of these samples are larger than 11 m. at which the soft steel plate is destroyed. A very few conventional commercial paints have such a large Erichsen value.

The cross cut test was conducted by forming 11 linecuts in the paint film with a razor blade in both the longitudinal and transverse directions at an interval of 1 mm., attaching a cellophane tape thereon with a sufficiently strong pressure and abruptly peeling said cellophane tape. The adhesion of the paint film was evaluated by comparing the state of separation of the paint film with a reference sample, and was graded by points of which 10 means that the paint film was not separated at all, 4 means that the paint film was partially separated at the intersections of the linecuts, and 0 means that the paint film was completely separated from the substrate plate. The cross cut test results of 4 paints and higher are usually regarded as satisfactory. Accordingly, it will be seen that the samples of Runs Nos. 3–6 are satisfactory in respect of adhesion.

From the above results of the drying tests and physical tests, it will be obvious that an excellent paint composition can be obtained only when a mixture of 20–40% by weight of the liquid polybutadiene and 80–60% by weight of the petroleum resin is used.

Table 1 shows that the results of the water resistance tests, the alkali resistance test and the solvent resistance test are in exactly the same trend as the results of the other tests discussed above.

The accelerated water resistance test was conducted in accordance with JIS K 5400 by immersing each sample in lukewarm water at 60° C. for 30 minutes, and the result thereof is regarded as "good" when no wrinkles, blistering and separation were observed in the paint film, or as "poor" otherwise.

The water resistance test was conducted in accordance with JIS K 5400 by immersing each sample in water at 20° C. for 3 days and observing the state of the sample.

The alkali resistance test was conducted by immersing each sample in a 3% caustic soda solution at 20° C. for 24 hours and observing the state of the sample. The test result is indicated by the symbol "o" which means that the state of the paint film was satisfactory, or by the symbol "x" which means that the state of the paint film was unsatisfactory.

The solvent resistance test was conducted by immersing each sample in a mineral terpene at 20° C. for 18 hours and observing the state of the sample. The test result is indicated by the symbol "o" which means that the state of the paint film was satisfactory, or the symbol "x" which means that the state of the paint film was unsatisfactory.

EXAMPLE 2

A liquid polybutadiene having a numerical average molecular weight of 3,500 and a viscosity of 1,500 centipoises (at 30° C.) and containing 86% of cis-1,4 structure was prepared in the same manner as in Example 1, except that a very small amount of water was added to the polymerization system to modify the catalyst. As the petroleum resin, Petrosin 80 (the trade name of a product of Mitsui Petrochemical Industries, Ltd.) having a softening point of 80° C. and Toho High Resin (the trade name of a product of Toho Chemical Company, Ltd.) having a softening point of 60° C. were used. Using these components, paint compositions were prepared at the same mixing ratio as that of the paint composition in Run No. 4 of Example 1.

Each of the paint compositions thus prepared was tested with the results shown in Table 2.

TABLE 2

|  | Petrosin 80 | Toho High Resin 60 |
|---|---|---|
| Set to touch time (min.) | 8 | 10. |
| Semi-curing time (min.) | 50 | 65. |
| Flexility test—2 mm. in diameter | 0 | 0. |
| Impact resistance test—500 g. x 50 cm | 0 | 0. |
| Erichsen value (mm.) | 11 | 11. |
| Cross cut value (point) | 10 | 10. |
| Water-resistance | Slightly whitened. | Slightly whitened. |
| Alkali resistance | 0 | 0. |
| Solvent resistance | 0 | 0. |
| Boiling water resistance | Wrinkles, blisters occurred. | Wrinkles, blisters occurred and separated. |

The boiling water resistance test was conducted in accordance with JIS K 5400 by immersing each sample in boiling water for 10 minutes and observing the state of the sample. It will be understood that the film of the paint composition comprising the petroleum resin having a softening point of 60° C. was separated from the substrate plate after the boiling water resistance test, and such paint composition is not adapted to practical use.

Upon comparing this example with Example 1, it will be noted that the drying speed increases with the molecular weight of the liquid polybutadiene becoming larger. It will also be understood from this example that, in case of the paint composition comprising 30% by weight of liquid polybutadiene and 70% by weight of petroleum resin, a satisfactory result can be obtained when the softening point of the petroleum resin is 80° C. but the physical properties degrade as a whole and especially the boiling water resistance degrades to such a degree as will make the paint composition unserviceable when the softening point of the petroleum resin is lower.

We claim:

1. An improved petroleum resin paint composition comprising a film-forming element and a solvent; the main component of said film-forming element consisting essentially of a mixture of 20–40% by weight of a liquid polybutadiene having at least 70% of the unsaturated double bonds thereof of cis-1,4 structure and a numerical average molecular weight in the range of 1,000–5,000, and 80–60% by weight of a petroleum resin having a softening point in the range of 80–130° C.

2. An improved petroleum resin paint composition comprising a film-forming element and a solvent; the main component of said film-forming element consisting essentially of a mixture of 20–40% by weight of a liquid polybutadiene having at least 70% of the unsaturated double bonds thereof of cis-1,4 structure and a numerical average molecular weight in the range of 1,000–5,000, and 80–60% by weight of a petroleum resin having a softening point in the range of 80–130° C., an acid value of not larger than 1, an iodine value of 30–300, an average molecular weight of 350–1,500 and a Gardner color value of not larger than 13.

3. An improved petroleum resin paint composition comprising a film-forming element and a solvent; the main component of said film-forming element consisting essentially of a mixture of 20–40% by weight of a liquid polybutadiene having at least 70% of the unsaturated double bonds thereof of cis-1,4 structure and a numerical average molecular weight in the range of 1,000–5,000, said polybutadiene obtained by polymerizing a butadiene using a Ziegler catalyst consisting essentially of an organoaluminum halide and a nickel compound, and 80–60% by weight of a petroleum resin having a softening point in the range of 80–130° C., an acid value of not larger than 1, an iodine value of 30–300, an average molecular weight of 350–1,500 and a Gardner color value of not larger than 13.

References Cited

UNITED STATES PATENTS

| | | | |
|---|---|---|---|
| 3,035,013 | 5/1962 | Cull et al. | 260—45.5 |
| 3,329,734 | 7/1967 | Schleimer et al. | 260—680 B |

OTHER REFERENCES

Ency. Poly. Sci. & Tech. (Interscience, 1967), 9, 956–959.

Martens, Tech. of Paints, Var. & Lacq. (Reinhold, 1968), pp. 108, 109.

ALLAN LIEBERMAN, Primary Examiner

T. DE BENEDICTIS, SR., Assistant Examiner

U.S. Cl. X.R.

117—124 E, 132 CB; 260—33.6 UA, 680 B